(12) United States Patent
Hamza et al.

(10) Patent No.: US 7,826,666 B2
(45) Date of Patent: Nov. 2, 2010

(54) METHODS AND APPARATUS FOR RUNWAY SEGMENTATION USING SENSOR ANALYSIS

(75) Inventors: Rida M. Hamza, Maple Grove, MN (US); Mohammed Ibrahim Mohideen, Karnataka (IN); Dinesh Ramegowda, Karnataka (IN); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 121 days.

(21) Appl. No.: 12/336,976

(22) Filed: Dec. 17, 2008

(65) Prior Publication Data

US 2009/0214080 A1    Aug. 27, 2009

Related U.S. Application Data

(60) Provisional application No. 61/031,900, filed on Feb. 27, 2008.

(51) Int. Cl.
*G06K 9/68* (2006.01)
*G06G 7/70* (2006.01)

(52) U.S. Cl. .................. 382/218; 382/274; 701/16

(58) Field of Classification Search .................. 382/103, 382/100, 107, 106, 155, 168, 177, 181, 191, 382/199, 202, 209, 214, 232, 254, 276, 288–297, 382/312; 455/3.06; 701/16, 301; 73/170.13; 340/953; 244/3.17
See application file for complete search history.

(56) References Cited

U.S. PATENT DOCUMENTS

| | | | |
|---|---|---|---|
| 5,719,567 A * | 2/1998 | Norris | 340/953 |
| 5,762,292 A * | 6/1998 | Schweyer et al. | 244/3.17 |
| 5,979,234 A * | 11/1999 | Karlsen | 73/170.13 |
| 6,157,876 A | 12/2000 | Tarleton, Jr. et al. | |
| 6,606,563 B2 * | 8/2003 | Corcoran, III | 701/301 |
| 6,952,632 B2 * | 10/2005 | Robert et al. | 701/16 |

(Continued)

OTHER PUBLICATIONS

Doehler, H-U et al., "Autonomous infrared-based guidance system for approach and landing," Proceedings of SPIE-Enhanced and Synthetic Vision, 2004, pp. 140-147, vol. 5424.*

(Continued)

*Primary Examiner*—Seyed Azarian
(74) *Attorney, Agent, or Firm*—Ingrassia Fisher & Lorenz, P.C.

(57) ABSTRACT

Systems and methods for determining whether a region of interest (ROI) includes a runway are provided. One system includes a camera for capturing an image of the ROI, an analysis module for generating a binary large object (BLOB) of at least a portion of the ROI, and a synthetic vision system including a template of the runway. The system further includes a segmentation module for determining if the ROI includes the runway based on a comparison of the template and the BLOB. One method includes the steps of identifying a position for each corner on the BLOB and forming a polygon on the BLOB based on the position of each corner. The method further includes the step of determining that the BLOB represents the runway based on a comparison of the polygon and a template of the runway. Also provided are computer-readable mediums storing instructions for performing the above method.

19 Claims, 7 Drawing Sheets

U.S. PATENT DOCUMENTS 7,565,105 B1 * 7/2009 Fujisaki ..................... 455/3.06

OTHER PUBLICATIONS

Hamza, R. et al., "Runway positioning and moving object detection prior to landing," Augmented Vision Perception in Infrared, Advances in Pattern Recognition, Jan. 1, 2009, pp. 243-269, Springer, London.

Gong, X. et al., "A Survey of techniques for detection and tracking of airport runways," Collection of Technical Papers—44th AIAA Aerospace Sciences Meeting and Exhibit, Jan. 9-12, 2006, pp. 1-14, vol. 23.

European search report for Application No. 09152623, mailed Jul. 2, 2009.

* cited by examiner

METHODS AND APPARATUS FOR RUNWAY SEGMENTATION USING SENSOR ANALYSIS

CROSS-REFERENCES TO RELATED APPLICATIONS

This application claims the benefit of U.S. Provisional Application No. 61/031,900, filed on Feb. 27, 2008.

TECHNICAL FIELD

The present invention relates generally to providing guidance to aircraft crew, and more particularly, relates to forming a combined sensor and synthetic navigation data that provides guidance to aircraft operators in limited or no visibility conditions.

BACKGROUND

The need to land aircraft, such as airplanes, helicopters, and spacecraft in zero/zero conditions is driving sensor fusion and computer vision systems for next-generation head-up displays. Safely landing the aircraft requires accurate information about the location of a target (e.g., runway). During an approach to a runway, the pilot must carefully control the navigation of the aircraft relative to a touchdown point. That is, pilots need to have a good situational awareness (e.g., heads up) of the outside world through heavy fog, smoke, snow, dust, or sand, to detect runways and obstacles on runways and/or in the approach path for a safe landing.

Advanced synthetic vision is a major focus of aerospace industry efforts to improve aviation safety. Some current research is focused on developing new and improved Enhanced Vision Systems. In these research efforts, there were various attempts to fuse sensor data from different modalities (based upon certified sensor availability) with synthetic vision platforms to provide pilots with additional features so that they can easily navigate to an airport, identify potential hazards, take avoidance action, and/or obtain sufficient visual reference of the runway.

The navigation data from a synthetic vision system (SVS) database is generated by many sources including, but not limited to, a differential global positioning system (DGPS), an inertial reference system (IRS), an attitude-heading reference system (AHRS), satellite and ground based devices (e.g., Instrument Landing Systems (ILS) and Microwave Landing System (MLS)). SVS modeling is advancing toward improving situational awareness in supporting pilots' ability to navigate in all conditions by providing information such as pitch, roll, yaw, lateral and vertical deviation, barometric altitudes and global positioning with runway heading, position, and dimensions. However, under low visibility conditions the pilot may not be able to visually verify the correctness of navigation data and the SVS database. Because SVS data is based on archived information (taken at earlier time than the time of the flight), the data can be impeded by updates into the scene, and thus, some cues may be missing from the actual data. In addition, navigation data cannot be used to navigate the aircraft to avoid obstacles on or near a runway because SVS models do not provide real-time information related to obstacles. Moreover, only a limited number of runways are equipped with adequate devices for providing accurate navigation attributes with the required accuracy to safely make low approaches and high-end equipment (e.g., ILS) is costly and is not available at all airports or to all runways at a particular airport.

Accordingly, there is a need to analyze real-time sensor imageries and fuse sensor data with SVS data to provide pilots with additional features so that they can easily navigate to the airport, identify potential hazards, take avoidance action, and obtain sufficient visual reference of a runway in real-time. As such, various embodiments of the present invention are configured to provide visual cues from one or more sensor images to enable a safe landing approach and minimize the number of missed approaches during low visibility conditions.

BRIEF SUMMARY OF THE INVENTION

Systems for determining whether a region of interest (ROI) includes a runway having a plurality of corners are provided. One system comprises a camera configured to capture an image of the ROI, an analysis module coupled to the camera and configured to generate a binary large object (BLOB) of at least a portion of the ROI, and a synthetic vision system (SVS) including a template of the runway. The system further comprises a segmentation module coupled to the analysis module and the SVS. The segmentation algorithm is configured to determine if the ROI includes the runway based on a comparison of the template and the BLOB.

Various embodiments also provide methods for determining whether a binary large object (BLOB) represents a runway having a plurality of corners. One method comprises the steps of identifying a position for each corner on the BLOB and forming a polygon on the BLOB based on the position of each corner. The method further comprises the step of determining that the BLOB represents the runway based on a comparison of a template of the runway and the polygon.

Also provided are computer-readable mediums including instructions that, when executed by a processor, cause the processor to perform a method for determining whether a binary large object (BLOB) represents a runway having a plurality of corners. One computer-readable medium includes instructions for a method comprising the steps of identifying a position for each corner on the BLOB and forming a polygon on the BLOB based on the position of each corner. The method further comprises the step of determining that the BLOB represents the runway based on a comparison of a template of the runway and the polygon.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention, the application, and/or uses of the invention. Furthermore, there is no intention to be bound by any theory presented in the preceding background or the following detailed description.

An apparatus is provided for locating a runway by detecting the runway coordinates and edges within data representing a region of interest (ROI) provided by a synthetic vision sensor. The following aspects of the invention are described in conjunction with the pictorial illustrations and block diagrams, and those skilled in the art will appreciate that the scope of the invention is not limited to and/or by these illustrations. Modifications in the section, design, and/or arrangement of various components and steps discussed in what follows may be made without departing form the intended scope of the invention.

Figure 1:
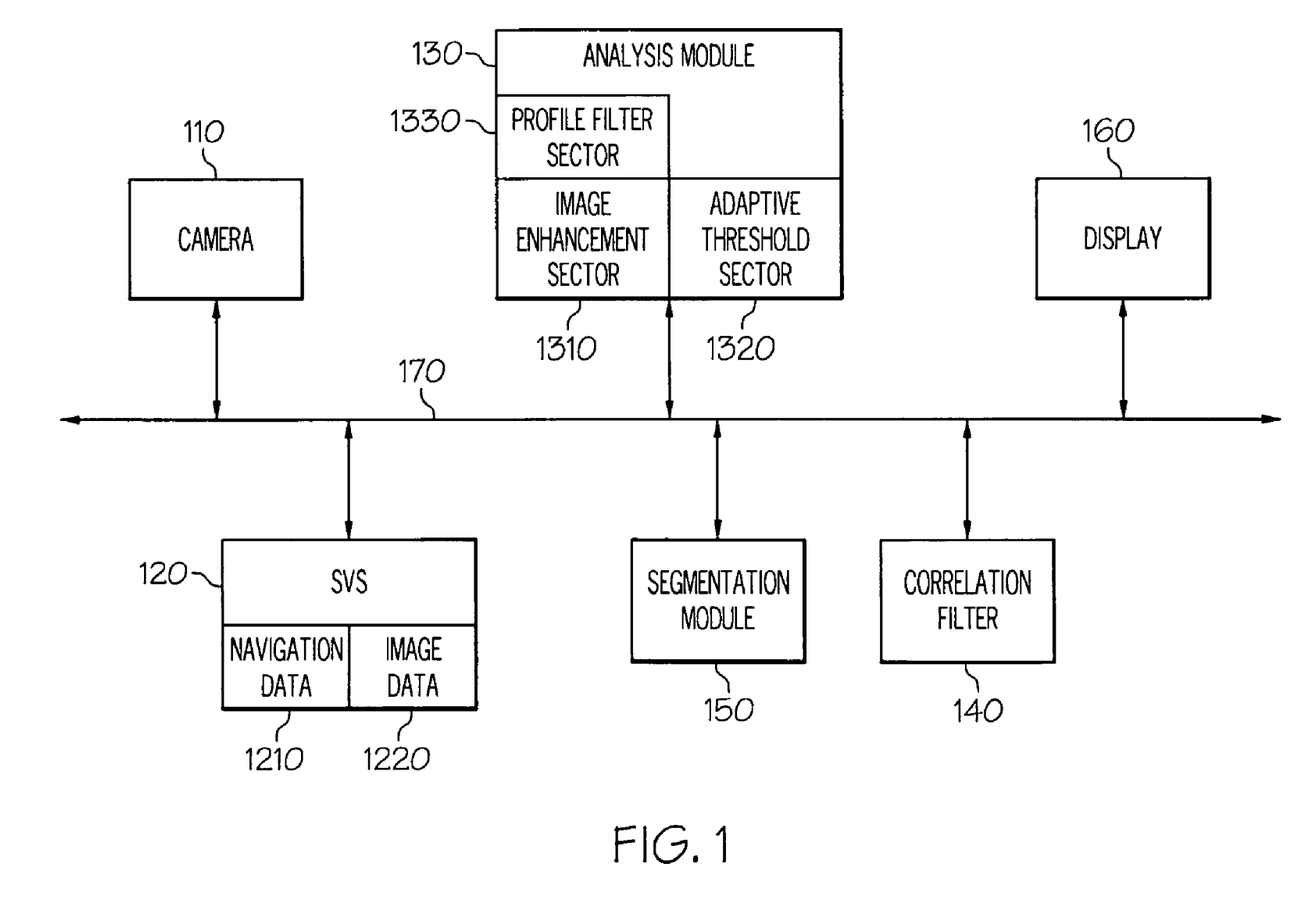
FIG. 1 is a block diagram of one embodiment of a system for segmenting a runway.

Turning now to the figures, FIG. 1 is a block diagram of one embodiment of a system 100 for segmenting a runway. At least in the illustrated embodiment, system 100 comprises a camera 110, a synthetic vision system (SVS) database 120, an analysis module 130, a correlation filter 140, a segmentation module 150, and a display 160 coupled to one another via a bus 170 (e.g., a wired and/or wireless bus).

Camera 110 may be any system, device, hardware (and software), or combinations thereof capable of capturing an image of region of interest (ROI) within an environment. In one embodiment, camera 110 is a forward-looking camera is mounted on a vehicle (e.g., an aircraft, a spacecraft, etc.) with a predefined field of view that overlaps the same scene being surveyed by navigation data stored in SVS database 120.

SVS database 120 is configured to store navigational data 1210 representing one or more regions of interest (ROI) including a target (e.g., a runway, a landing strip, a landing pad, and the like) that is present in the environment being surveyed by camera 110. SVS database 120 is further configured to provide the portion of navigational data 1210 related to an ROI where a runway (i.e., a target) is presumably present in the forward vicinity of the present location of system 100.

SVS database 120 is also configured to store imagery data 1220 (e.g., target templates or target images) that mimics the corresponding real-world view of each target. That is, imagery data 1220 contains one or more target templates that illustrate how a target should look from one or more visual perspectives (e.g., one or more viewing angles, one or more viewing distances, etc.). SVS database 120 is further configured to provide imagery data 1220 (i.e., a template) representing the one or more visual perspectives of the target.

To provide navigational data 1210 and imagery data 1220, SVS database 120 is configured to sort through various sources of information (not shown) related to airports, ranging, and other similar information for the present ROI. Specifically, SVS database 120 is configured to obtain the present location of system 100 from an external source (e.g., a global positioning system (GPS)) and retrieve the corresponding portions of navigational data 1210 and imagery data 1220 (e.g., runway template) for the ROI related to the present location of system 100. Once the corresponding portions of navigational data 1210 and imagery data 1220 are retrieved, the corresponding portions of navigational data 1210 and imagery data 1220, along with the images captured by camera 110, are transmitted to analysis module 130.

Analysis module 130, at least in the illustrated embodiment, includes an image enhancement sector 1310, an adaptive threshold sector 1320, and a profile filter sector 1330. Since the images captured by camera 110 may contain noise (e.g., flicker noise, electronic noise, coding artifacts, quantization artifacts during digitization, etc.) that can influence the accuracy of the runway segmentation, image enhancement sector 1310 comprises one or more filters (e.g., a Median Filter, a Gaussian filter with zero average, etc) to filter the noise from the captured images.

More advanced filters applying an edge-preserving smoothing algorithm are available in the art and various embodiments of the invention contemplate such advanced edge-preserving smoothing algorithms. For example, one filter may use multi-peak histogram equalization where midnodes are locally determined and the affected regions (i.e. regions with contracted contrast) are substituted with generalized histogram intensities. Another filter may use a Kuwahara filter where a square systematic neighborhood is divided into four overlapping windows, with each window containing a central pixel that is replaced by the mean of the most homogeneous window (i.e., the window with the least standard deviation).

After filtering, image enhancement sector 1310 is configured to enhance the contrast of the captured ROI to bring uniformity into the analysis. In one embodiment, image enhancement sector 1310 is configured to "stretch" the contrast (also known as, "contrast normalization") to improve the captured image. That is, the contrast in a captured image is improved by "stretching" the range of intensity values within the predefined ROI. For example, given the image I(x,y), the contrast corrected image G(x, y) is defined as follows:

$$G(x, y) = D_{min} + \left(\frac{\min(I(x, y), I_M) - \max(I(x, y), I_m)}{(I_M - I_m)}\right)(D_{max} - D_{min}),$$

where $D_{max}$ and $D_{min}$ are the desired limits for operation (e.g. assuming 8 bit resolution, the values are depicted at 255 and 0) and $I_{max}$ & $I_{min}$ are the maximum and minimum gray values of the image I(x,y) excluding some outliers depicted at the tail of the image intensity distribution. These outliers are then removed to limit their side effect on the choice of the desired contrast range.

Figure 2:
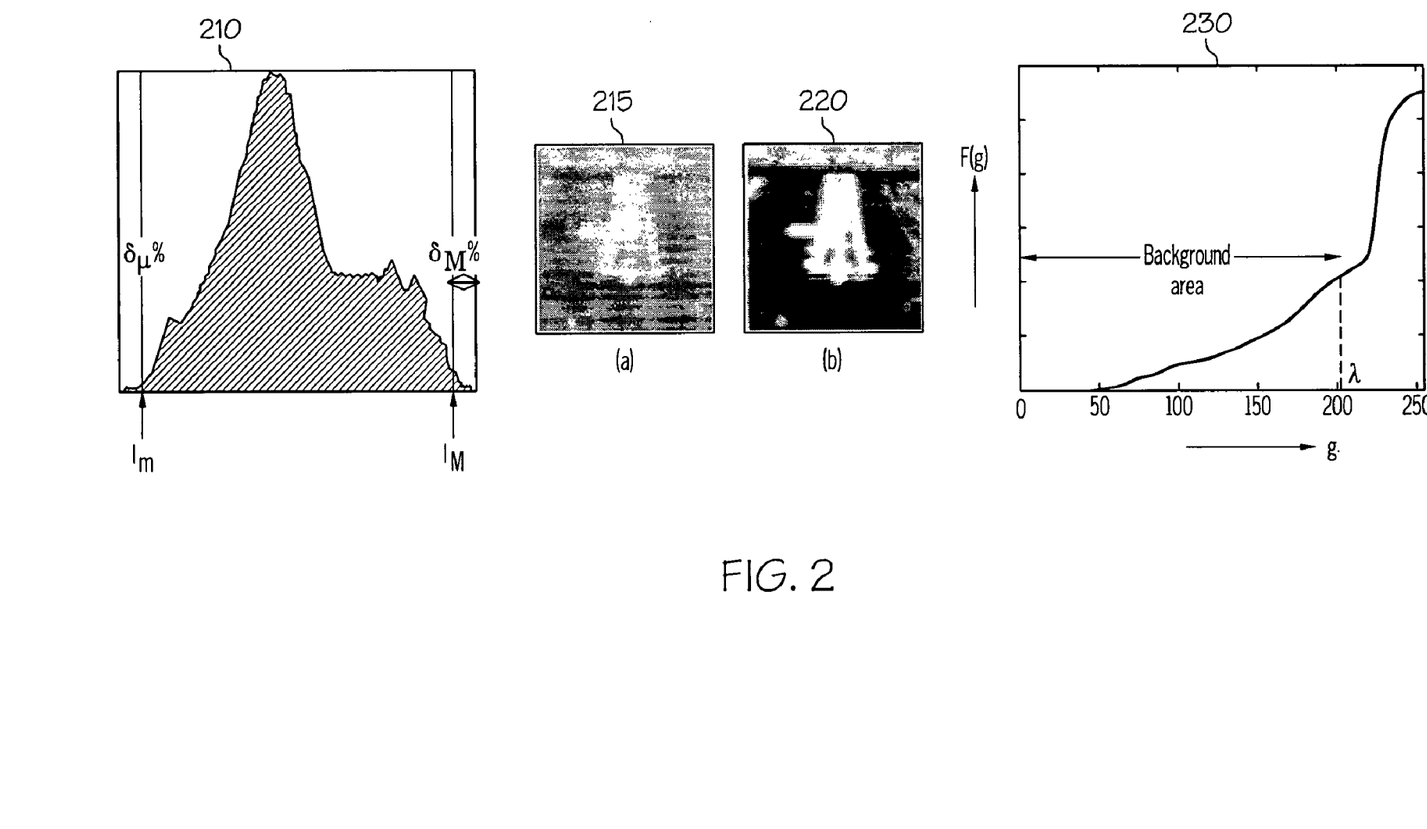
FIG. 2 is a diagram illustrating dynamic range calibration for image enhancement.

For example, FIG. 2 shows one example of an output of image enhancement sector 1310 (via display 160). Portion 210 of FIG. 2 illustrates the choice of outliers and images 215, 220 illustrate the contrast enhancement, image 215 being the original image and image 220 being the filtered image. Portion 230 of FIG. 2 depicts a curve that represents the cumulative distribution of a normalized histogram. The data representing the ROI is enhanced by normalizing the contrast locally around the runway and its surroundings within the ROI prior to analysis.

In addition to the target runway, the captured images may include extraneous objects (e.g., a secondary runway, a taxiway, a mountainous structure beside the airport, and/or any other structure with similar sensing characteristics within the associated IR wavelength). To reduce the potential impact that extraneous objects may have on the analysis, profile filter sector 1330 is configured to process the captured images to generate a binary image of the ROI including a binary large object (BLOB) that can be analyzed for the presence of a runway.

Profile filter sector 1330 is configured to generate a BLOB and to separate the runway from the rest of the background.

To accomplish such separation, profile filter sector 1330 uses the following cues for background-foreground segmentation:

(1) The proportion of template surface area to ROI surface area is approximated;

(2) The runway BLOB center of mass should be closest to the template geometric center; and (3) The target runway structure should be similar in size to the template structure. Each of these three cues will now be discussed for clarification.

To approximate the proportionality of the template and ROI surface areas, profile filter sector 1330 is configured to depict a probability density function of the intensity data representing the ROI to segment the foreground pixels from the background pixels. A histogram estimator is then used to approximate the density function so that the runway BLOB is represented by a grouping of pixels in the histogram that makes up a certain percentage of the overall ROI data above the adaptive threshold. The percentage of the BLOB is determined from synthetic runway proportion estimates from data sets based upon the positioning of system 100 with respect to the runway coordinates and orientation perspective.

Figure 3:
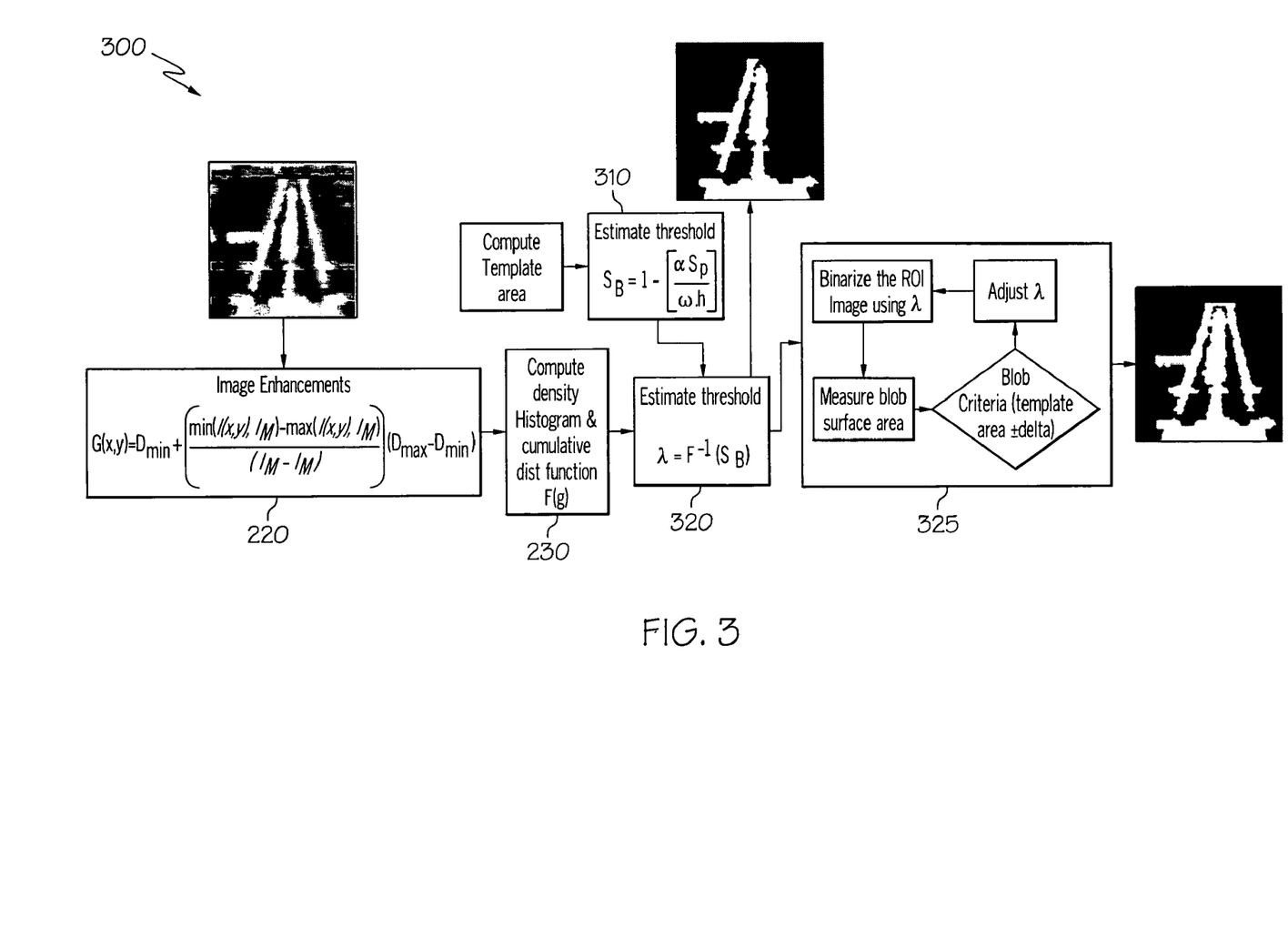
FIG. 3 is a block diagram of one embodiment of a validation algorithm included in the image enhancement section included in the system of FIG. 1.

A validation algorithm 300 (see FIG. 3) then determines whether a runway exists within the predefined ROI by employing one or more combinations of validation processes of the following queries:

1) Measuring the offset of the center of mass of the runway BLOB with respect to the template;

2) Verifying the actual size of the estimated BLOB with respect to the ROI and template; and 3) Verifying the shape of the BLOB. Failure to validate any one of these measures results in a report of no target within the specified region.

The threshold required to segment foreground pixels from background pixels is derived based upon the analysis of the cumulative histogram of intensities and its distribution within the ROI. First, the area that the background region occupies within the ROI is estimated as:

$$S_B = 1 - \left[\frac{\alpha S_p}{\omega \cdot h}\right],$$

where $\omega$ and $h$ represent the width and height of the associated ROI, respectively, and $S_p$ is the area within the specified template polygon (block 310). The template size is scaled by $\alpha$ to account for variations in range, orientation, and synthetic noise margin.

Once the background area is estimated, the corresponding intensity level at which the cumulative histogram value equals background area will be used as a cut off value for thresholding (block 320). If $H(g)=\partial F/\partial g$ represents the ROI image normalized histogram (i.e. $\int H(g)dg=1$) and $F(g)$ represents the cumulative distribution function of H, then the threshold $\lambda$ can be derived as:

$$F(\lambda)=S_B \Rightarrow \lambda=F^{-1}(S_B).$$

Portion 230 of FIG. 2 illustrates the threshold selection from the cumulative distribution function curve. Based on the estimated threshold, a one-step binarization procedure is performed to obtain the initial binary image.

$$B(x, y) = \begin{cases} = 0 & \text{if } I(x, y) < \lambda \\ = 1 & \text{o.w.} \end{cases}$$

The resulting binary image is further processed using morphological operations to reduce speckle noise, to fill in for missing pixels, and/or to remove eroded outliers (block 325).

Often, the binary image comprises more than one BLOB, possibly because the ROI covers more than one runway or a runway and a taxiway. To pick the target runway, the BLOB having a mass center that is closest to the template centroid is selected.

To compensate for inconsistent runway scenes (e.g., texture-less surface versus stripe-painting on some runway areas, lighting conditions, and the like conditions), profile filter sector 1330, in one embodiment, performs an iterative binarization procedure with varied cut-off values until desired characteristics for the BLOB are obtained. Upon completion of initial thresholding, the surface area of the BLOB is measured and the threshold is again fine tuned to match the size of the predicted template. That is, the iteration is continued until $|\hat{S}_P - S_P|$ reaches a minimum value as shown in FIG. 3.

Figure 4:
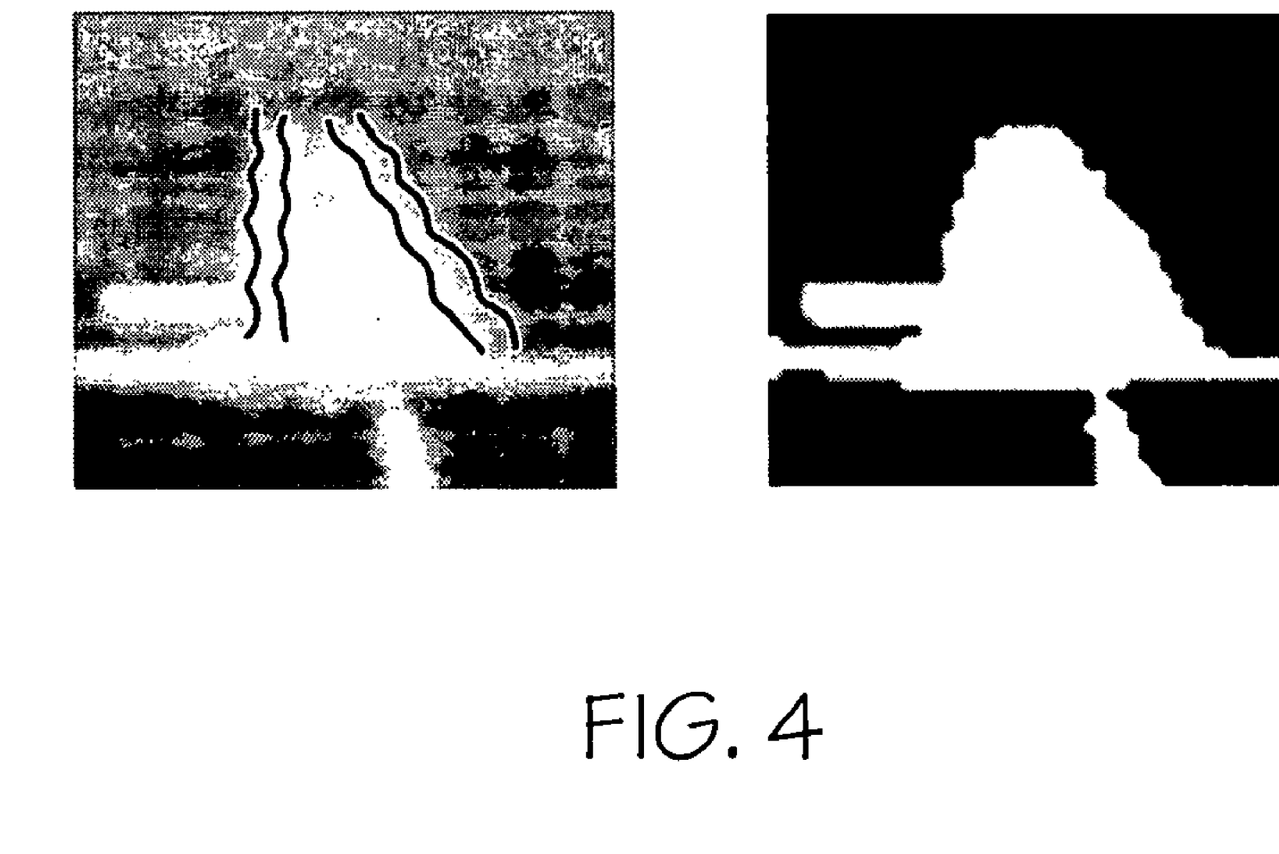
FIG. 4 is a diagram illustrating an embodiment of a binary large object (BLOB) that represents a runway generated by the system of FIG. 1 from a captured image.

It has been observed that in certain scenarios roads with a structure similar to a runway can pose a problem in identifying the actual runway. The difficulty arises due to the fact that these non-runway regions span the thermal profile of the runway and, hence, non-runway regions are mapped to contrast levels that are equal to, or nearly equal to, that of the runway region. This artifact is depicted in FIG. 4 where a series of lamp poles may be confused with the actual lighting signals located at the runway edges. FIG. 4 also depicts that, in addition to the runway region, there exists a road along one side of the runway. When processed, these non-runway structures near the target runway, in effect, may extend the boundaries of the runway BLOB 420. The impact of this noise extends the BLOB beyond the runway boundaries to include extraneous regions within the scene.

Figure 5:
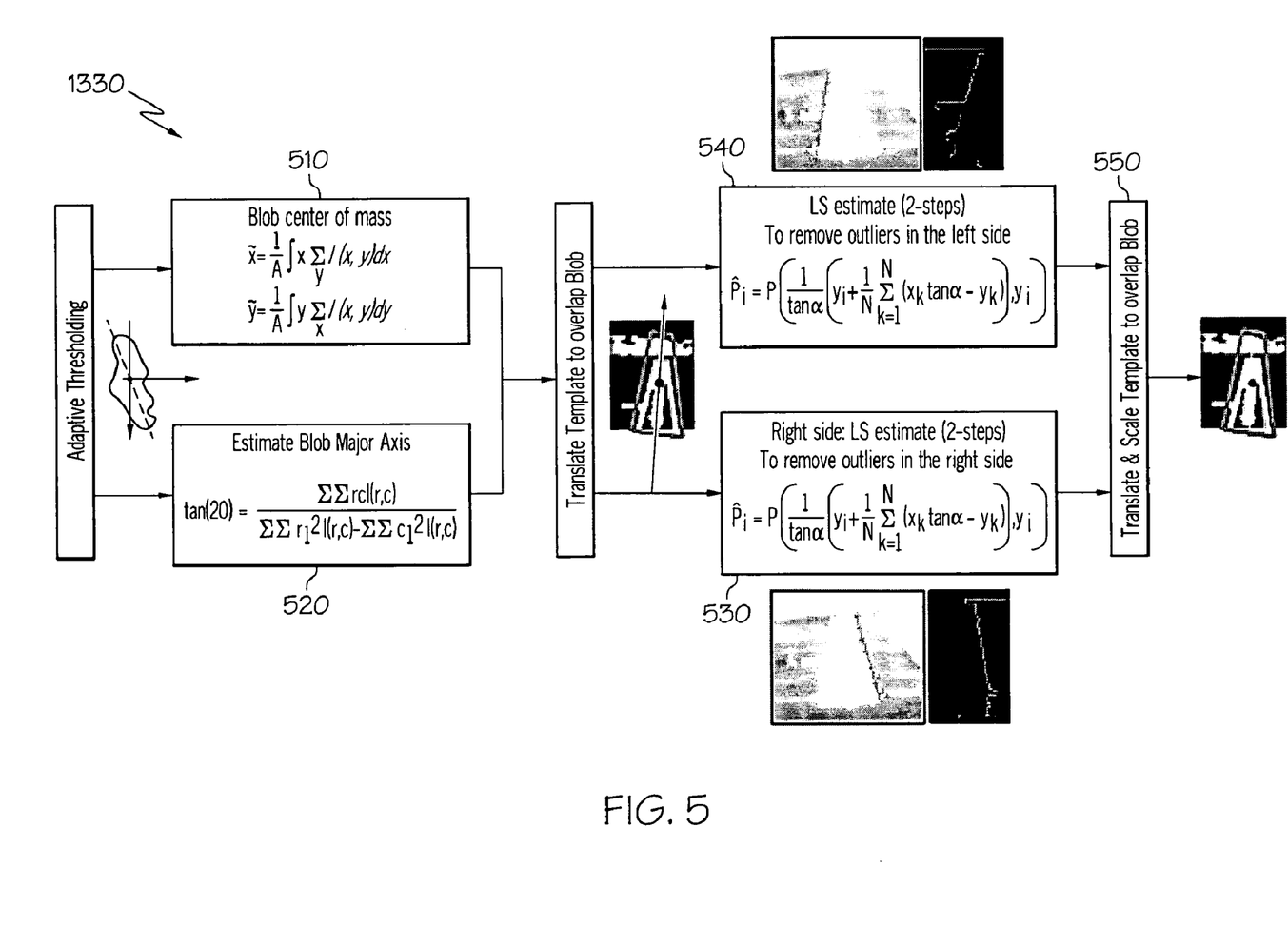
FIG. 5 is a block diagram illustrating one embodiment of a profile filter sector included within the system of FIG. 1.

To further reduce the ambiguity associated with segmentation of the actual runway boundaries from those of the secondary driveways and taxiways, system 100 uses correlation filter 140 to perform one or more filtering processes. The one or more filtering processes predict the expected target orientation and shape based upon the dynamics of the system and how the system is navigating (e.g., a Kalman filter approach or an approach using a like filter). Specifically, correlation filter 140 is configured to preserve those binary pixels associated with the perspective shape of a runway presented by the runway template and its perspective orientation projection into the 2D imagery plane. For example, based on the perspective field of view of an aircraft as it is approaching the runway, it is true that the runway width (measured as pixel distance between left edge and right edge of runway) monotonically increases as the top edge of the runway (i.e., the side of the runway farthest from the aircraft) is traversed to the bottom edge of the runway (i.e., the side of the runway closest to the aircraft). FIG. 5 illustrates the operation of one embodiment of profile filter sector 1330.

In one embodiment, the process for distinguishing between the runway features and non-runway features begins by determining the center of mass of the BLOB to centralize the template on top of the BLOB (block 510). The major axis of the template splits the BLOB into two parts (e.g., left edges and right edges) (block 520). An estimate using a least square algorithm is used to identify both sides (e.g., right and left sides) of the BLOB that fits the runway profile (blocks 530, 540). After the two sides have been identified, the top and bottom corners of the BLOB are connected to form a polygon (block 550). BLOB profile points that are outside the polygon are considered as outlying points and are ignored. The resulting polygon (e.g., a quadrilateral) is a pre-estimate for the runway edges that encloses the boundaries of the true BLOB.

Segmentation module 150 is configured to determine the appropriate boundaries for the polygon so that the polygon can be compared to the template. Determining the appropriate boundaries for the polygon for comparison to the template is important in effectively removing outliers from the BLOB profile. To overcome problems associated with non-uniform noise variations, the tolerance interval (or error range) is set as a function of the ranging perspective within the captured image. For example, a relatively large error margin is preferred for effective filtering of outliers near the top edge, while a relatively small error margin is required near the bottom edge so as to accommodate effects of pixel spillage since infrared image characteristics and other shape irregularities are typically seen near the bottom edge.

Figure 6:
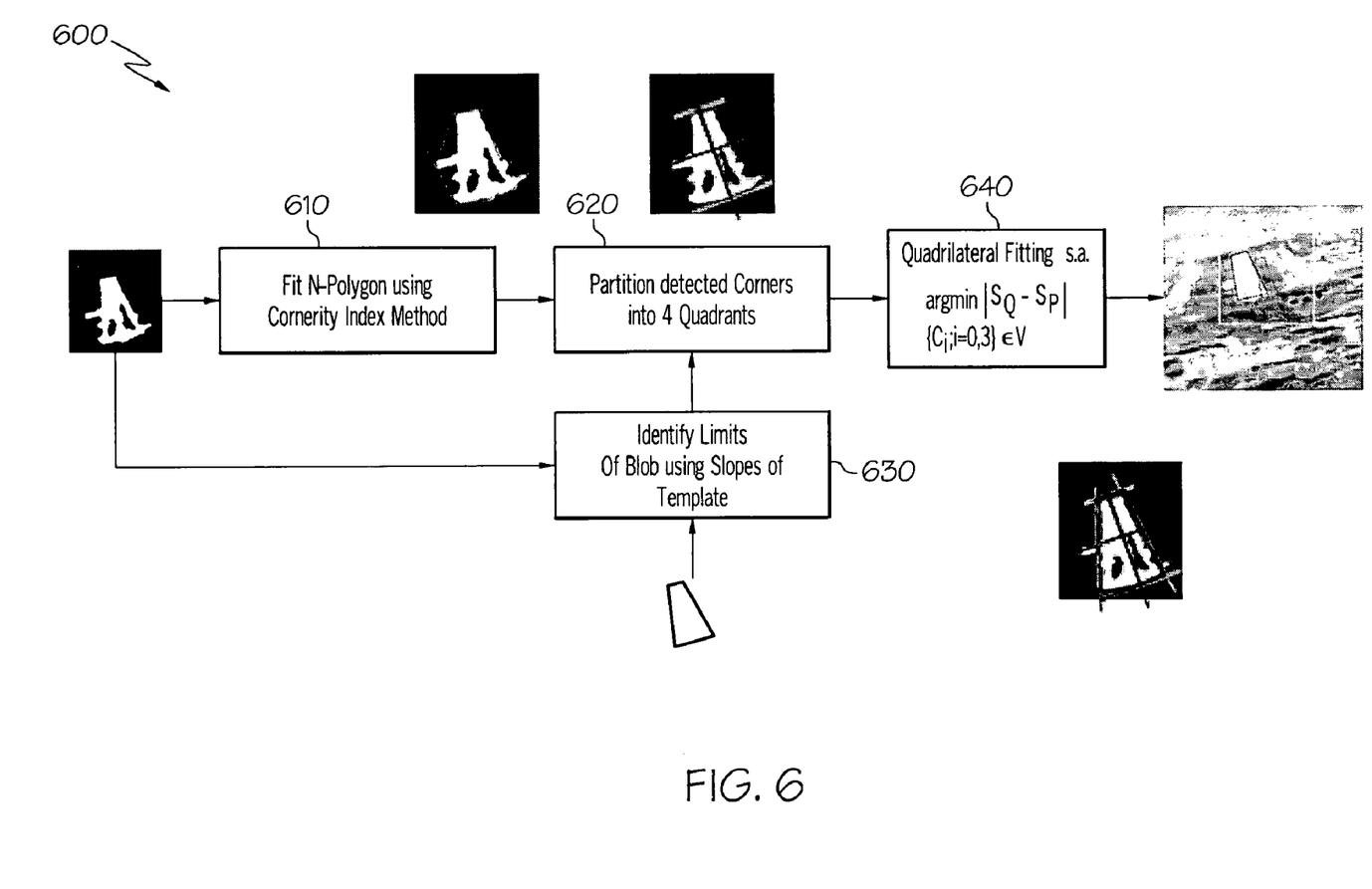
FIG. 6 is a block diagram illustrating one embodiment of a corner-based segmentation algorithm included within the system of FIG. 1.

In general, a contour includes both vertices (i.e., discontinuous edge points) and continuous edge points. Because discontinuous vertices define the limits of a contour, discontinuous vertices are the dominant points in fitting a model into a boundary. Accordingly, the corners of the BLOB are used to simplify the process of fitting a model to runway boundaries. Runway segmentation using a corner-based segmentation algorithm 600 stored in segmentation module 150 is shown in FIG. 6.

Figure 7:
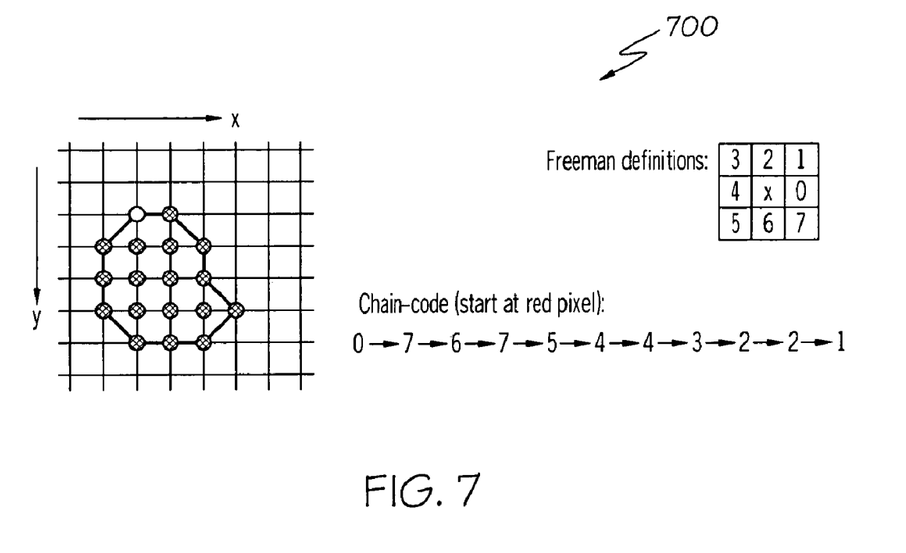
FIG. 7 is a diagram illustrating one embodiment of a Freeman chain code.

From the detected BLOB, a contour is extracted by subjecting the BLOB with a Freeman chain code 700 (see FIG. 7). That is, the BLOB is initially scanned to obtain a top most pixel, which is used as a starting point for contour tracing. Starting with this pixel and moving in, for example, a clockwise direction, each pixel is assigned a code based upon its direction from the previous pixel.

For example and with reference again to FIG. 6, let the sequence of n digital points describe a closed boundary curve of a BLOB, $B=\{P_i(x, y); i=1, \ldots, n\}$. To extract the corner points, a region of support covering both sides of a boundary pixel is defined. To qualify a boundary pixel as a corner point, a measure called a Cornerity Index based on statistical and geometrical properties of the pixel is defined (block 610). That is, let $S_k(p)=\{p_j/j=i-k; \ldots, i, \ldots, i+k\}$ denote a small curve segment of B called region of support of the point $p_i$, which is the center of the segment. The center point of the segment given by the following equation and is used to measure the shift of each edge point:

$$\overline{P}_i = \left(\overline{x}_i = \frac{1}{2k+1}\sum_{i-k}^{i+k} x_j, \overline{y}_i = \frac{1}{2k+1}\sum_{i-k}^{i+k} y_j\right)$$

As such, a corner point may be defined as any region of support having a mid-point that has a larger shift when compared to other points on the boundary curve. Therefore, the cornerity index of $P_i$ is defined to be the Euclidean distance $d=\sqrt{(x_i-\overline{x}_i)^2+(y_i-\overline{y}_i)^2}$ between the mid-points $P_i$ and its region of support mass center point $\overline{P}_i$. The Cornerity Index indicates the prominence of a corner point (i.e., the larger the value of the cornerity index of a boundary point, the stronger is the evidence that the boundary point is a corner). The computed cornerity indices are subjected to thresholding such that only boundary pixels with strong cornerity index are retained. The threshold is derived as a function of the region of support length to be at least $$\gamma \geq \frac{3k}{10\sqrt{2}}.$$

(This limit is derived based upon a corner with an angular range varies within $$0 \leq \phi \leq \frac{3\pi}{4}$$

and a region of support of length 5 (i.e. k=2)). The length of the region of support is selected as $$k = \min\left(5, \frac{\omega_R}{10}\right);$$

where the variable $\omega_R$ is the minimum expected runway width at all acquired ranges.

To obtain the four corners of the runway, the detected corner points are portioned into four quadrants formed by the major and minor axis of the BLOB (block 620). The slope of the BLOB major axis is assumed to be same as that of the template and the BLOB's geometrical centroid serves as the origin.

Figure 8:
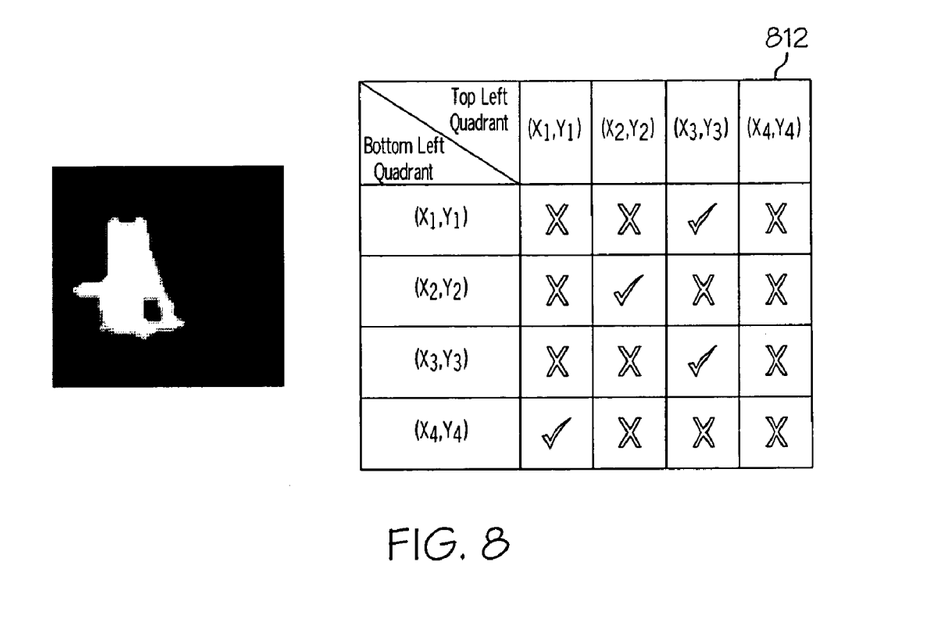
FIG. 8 is a diagram illustrating one embodiment of a consistency matrix.

Once the detected corner points are partitioned into four groups, the next step is to form a polygon such that the polygon has maximum BLOB area coverage. The process of finding such a polygon is divided into two step process where the points on the left quadrants are analyzed separately from the right quadrants. The basic step includes populating a consistency matrix with corner candidates where slope of selected four corners are within a certain margin based on the template estimates from the navigation data (see consistency matrix 810 in FIG. 8). The selection of the corners is done in pairs by matching template slopes using two corner pairs at the left side and two corner pairs at the right side as well (block 630). Next, a quadrilateral polygon with four points is selected from the consistency matrix such that they have a best fit measure with respect to the runway edges (block 640).

The corner detection estimates are sensitive to the size of the support region. While too large of a value for a support region will smooth out fine corner points, a small value will generate a large number of unwanted corner points. If there are no corner points in any one of the quadrants, the process is reiterated to adjust the length of the region of support for conversions. After a predefined number of iterations, if the process does not converge to create at least one corner in each quadrant, a "no runway" (i.e., "no target") report is generated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A system for determining whether a region of interest (ROI) includes a runway having a plurality of corners, comprising:
   a camera configured to capture an image of the ROI;
   an analysis module coupled to the camera and configured to generate a binary large object (BLOB) of at least a portion of the ROI, the analysis module configured to stretch a contrast of the captured image to create a range of intensity values in the captured image;
   a synthetic vision system (SVS) including a template of the runway; and
   a segmentation module coupled to the analysis module and the SVS, the segmentation module configured to determine if the ROI includes the runway based on a comparison of the template and the BLOB.

2. The system of claim 1, wherein the analysis module is further configured to identify a position for each corner on the BLOB and form a polygon on the BLOB based on the position of each corner.

3. The system of claim 2, wherein the analysis module is further configured to divide the BLOB into a left portion containing a first upper section and a first lower section, and a right portion containing a second upper section and a second lower section.

4. The system of claim 3, wherein the segmentation module is configured to identify a first slope from a corner in the first upper section to a corner in the first lower section, a second slope from a corner in the second upper section to a corner in the second lower section, or both.

5. The system of claim 4, wherein the segmentation module is further configured to:
   compare the first slope with a third slope on a left side of the template, comparing the second slope with a fourth slope on a right side of the template, or both; and
   determine that the BLOB represents the runway if the first slope matches the third slope within a predetermined error, if the second slope matches the fourth slope within the predetermined error, or both.

6. The system of claim 1, wherein the analysis module, in generating the BLOB, is further configured to:
   filter intensity values that are outside of the range of intensity values; and
   determine a shape of the BLOB based on the template.

7. The system of claim 6, wherein the segmentation module is further configured to:
   determine a center of mass of the BLOB based on the template;
   adjust one or more boundaries of the template; and
   filter pixels in the BLOB that lie outside of the adjusted one or more boundaries of the template.

8. A method for determining whether a binary large object (BLOB) represents a runway having a plurality of corners, comprising the steps of:
   generating a BLOB from a visual image of the runway, wherein generating the BLOB comprises stretching a contrast of the captured image to create a range of intensity values in the captured image;
   identifying a position for each corner on the BLOB;
   forming a polygon on the BLOB based on the position of each corner; and
   determining that the BLOB represents the runway based on a comparison of a template of the runway and the polygon; and
   rendering an enhanced image of the runway within a display device.

9. The method of claim 8, wherein the identifying step further comprises the step of dividing the BLOB into a left portion containing a first upper section and a first lower section, and a right portion containing a second upper section and a second lower section.

10. The method of claim 9, wherein the forming step further comprises the steps of:
    identifying a first slope from a corner in the first upper section to a corner in the first lower section; and
    identifying a second slope from a corner in the second upper section to a corner in the second lower section.

11. The method of claim 10, further comprising the steps of:
    comparing the first slope with a third slope on a left side of the template; and
    comparing the second slope with a fourth slope on a right side of the template, wherein the determining step comprises the step of determining that the BLOB represents the runway if the first slope matches the third slope within a predetermined error, if the second slope matches the fourth slope within the predetermined error, or both.

12. The method of claim 8, wherein the step of generating the BLOB further comprises the steps of:
    capturing an image of a region of interest;
    filtering intensity values that are outside of the range of intensity values; and
    determining a shape of the BLOB based on the template.

13. The method of claim 12, wherein forming the polygon comprises the steps of:
    determining a center of mass of the BLOB;
    adjusting one or more boundaries of the template; and
    filtering pixels in the BLOB that lie outside of the adjusted one or more boundaries of the template.

14. A computer-readable medium including instructions that, when executed by a processor, cause the processor to perform a method for determining whether a binary large object (BLOB) represents a runway having a plurality of corners, the method comprising the steps of:
    generating the BLOB, wherein generating the BLOB comprises:
       capturing an image of a region of interest, and
       stretching a contrast of the captured image to create a range of intensity values in the captured image;
    identifying a position for each corner on the BLOB;
    forming a polygon on the BLOB based on the position of each corner; and
    determining that the BLOB represents the runway based on a comparison of a template of the runway and the polygon.

15. The computer-readable medium of claim 14, further including instructions that cause the processor to perform the step of dividing the BLOB into a left portion containing a first upper section and a first lower section, and a right portion containing a second upper section and a second lower section.

16. The computer-readable medium of claim 15, further including instructions that cause the processor to perform the steps of:
    identifying a first slope from a corner in the first upper section to a corner in the first lower section; and
    identifying a second slope from a corner in the second upper section to a corner in the second lower section.

17. The computer-readable medium of claim 16, further including instructions that cause the processor to perform the steps of:
    comparing the first slope with a third slope on a left side of the template;

comparing the second slope with a fourth slope on a right side of the template; and determining that the BLOB represents the runway if the first slope matches the third slope within a predetermined error, if the second slope matches the fourth slope within the predetermined error, or both.

18. The computer-readable medium of claim 14, further including instructions that cause the processor to perform the step of generating a BLOB, wherein the instructions for generating the BLOB further comprises instructions that cause the processor to perform the steps of:

filtering intensity values that are outside of the range of intensity values; and determining a shape of the BLOB based on the template.

19. The computer-readable medium of claim 18, wherein the instructions for forming the polygon comprise instructions that cause the processor to perform the steps of:

determining a center of mass of the BLOB;

adjusting one or more boundaries of the template; and filtering pixels in the BLOB that lie outside of the adjusted one or more boundaries of the template.

\* \* \* \* \*